Dec. 17, 1935.     C. MORROW     2,024,179
PASTEURIZER
Original Filed June 14, 1930    7 Sheets-Sheet 3
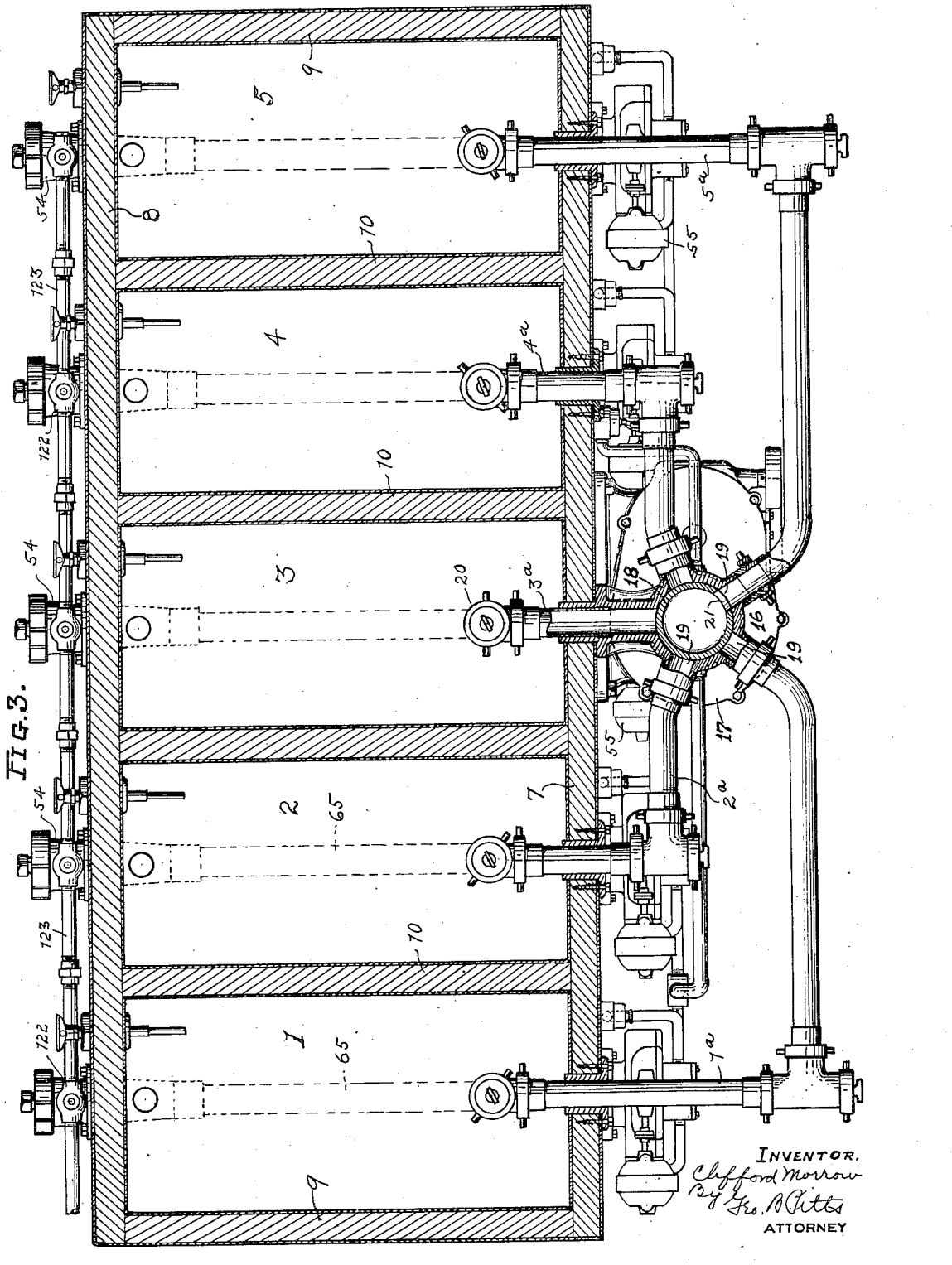
INVENTOR.
Clifford Morrow
By Geo. B Pitts
ATTORNEY

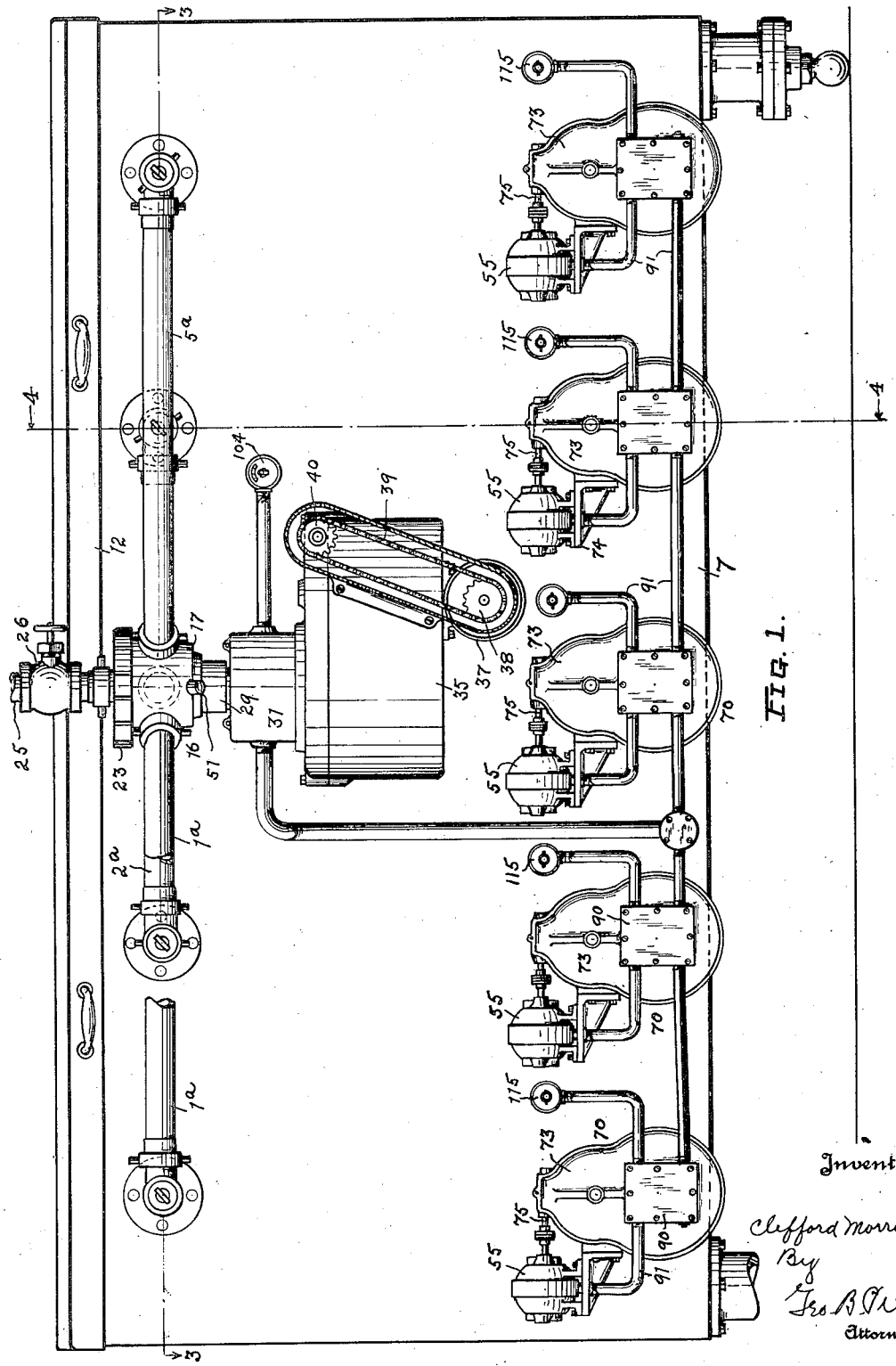

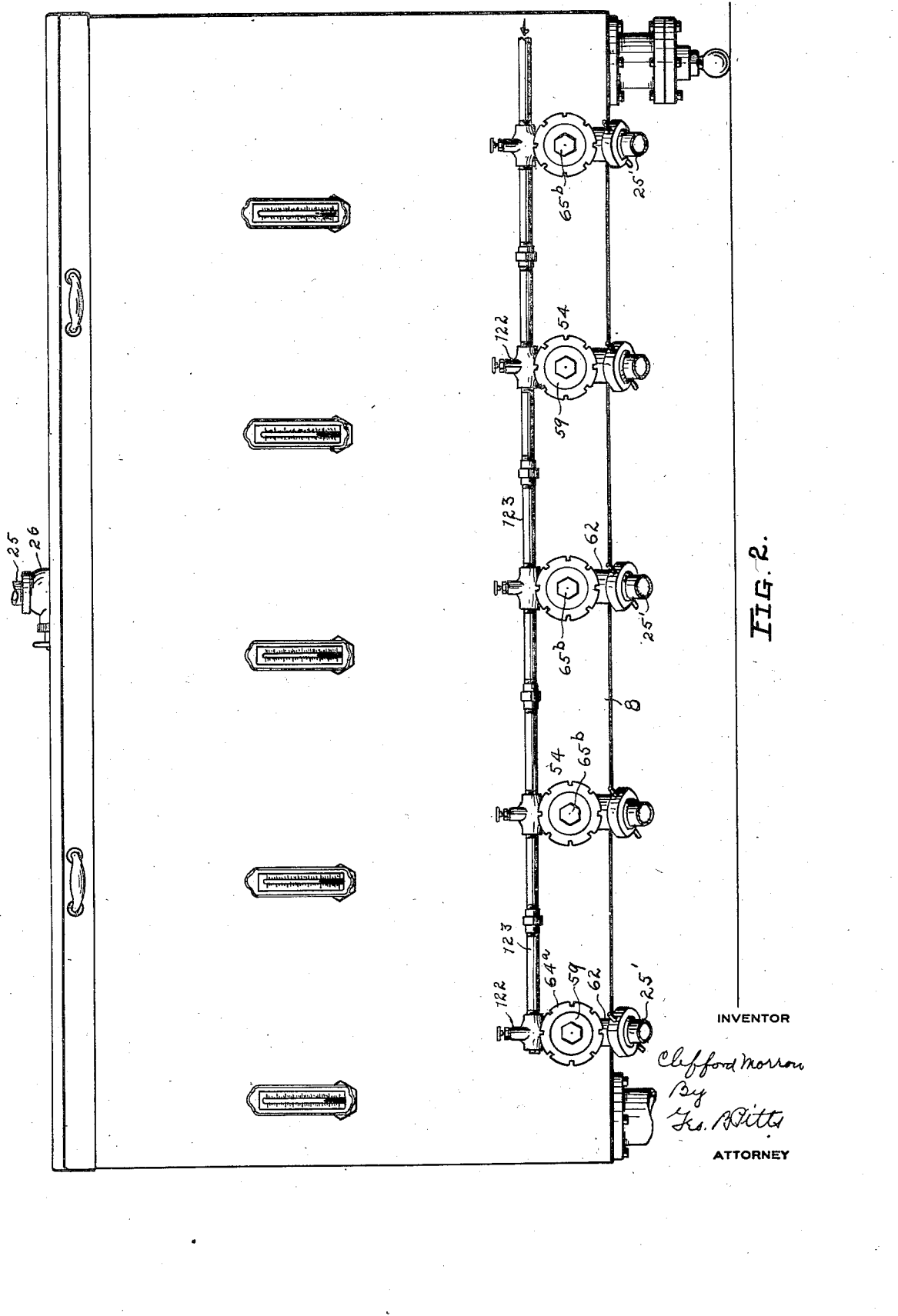

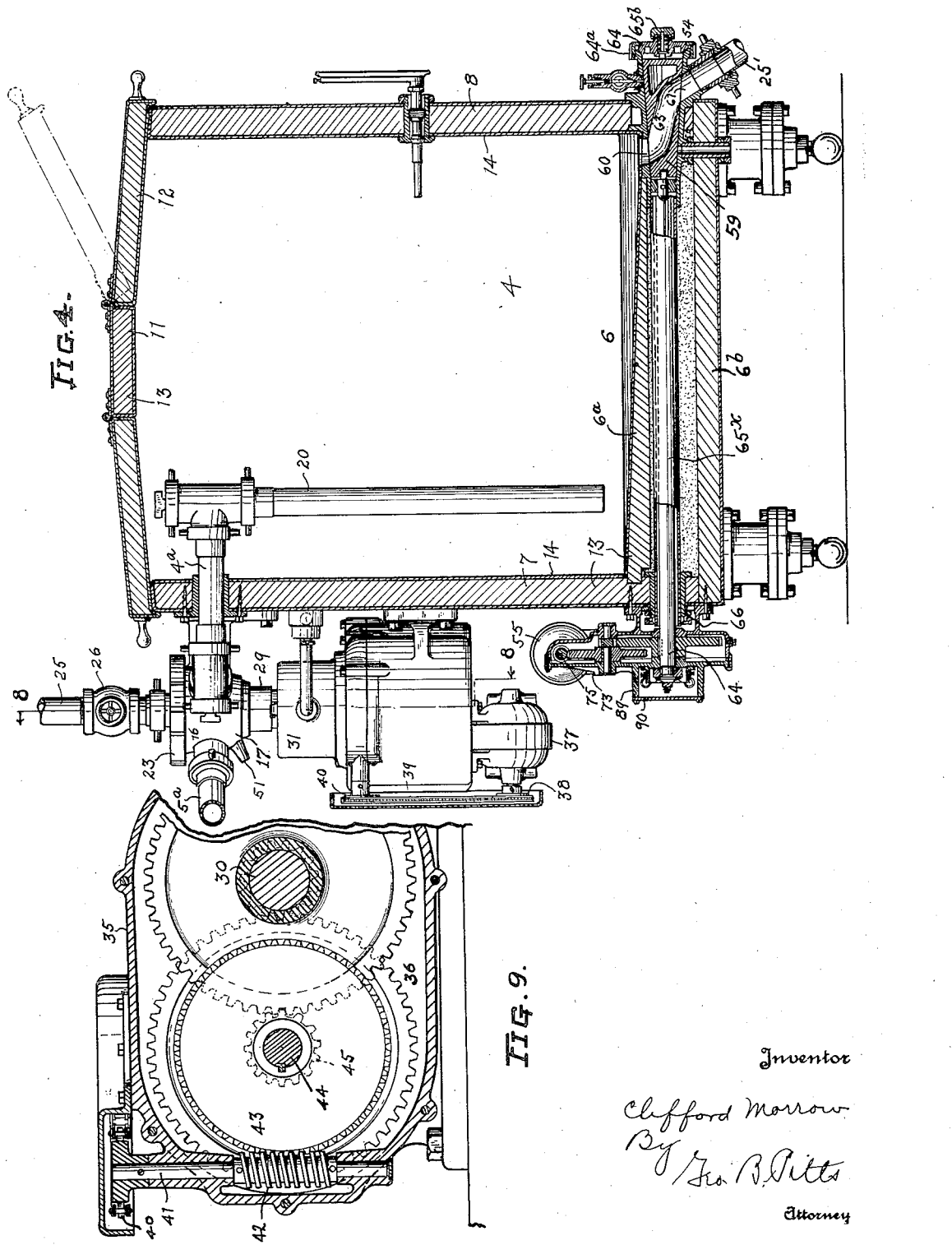

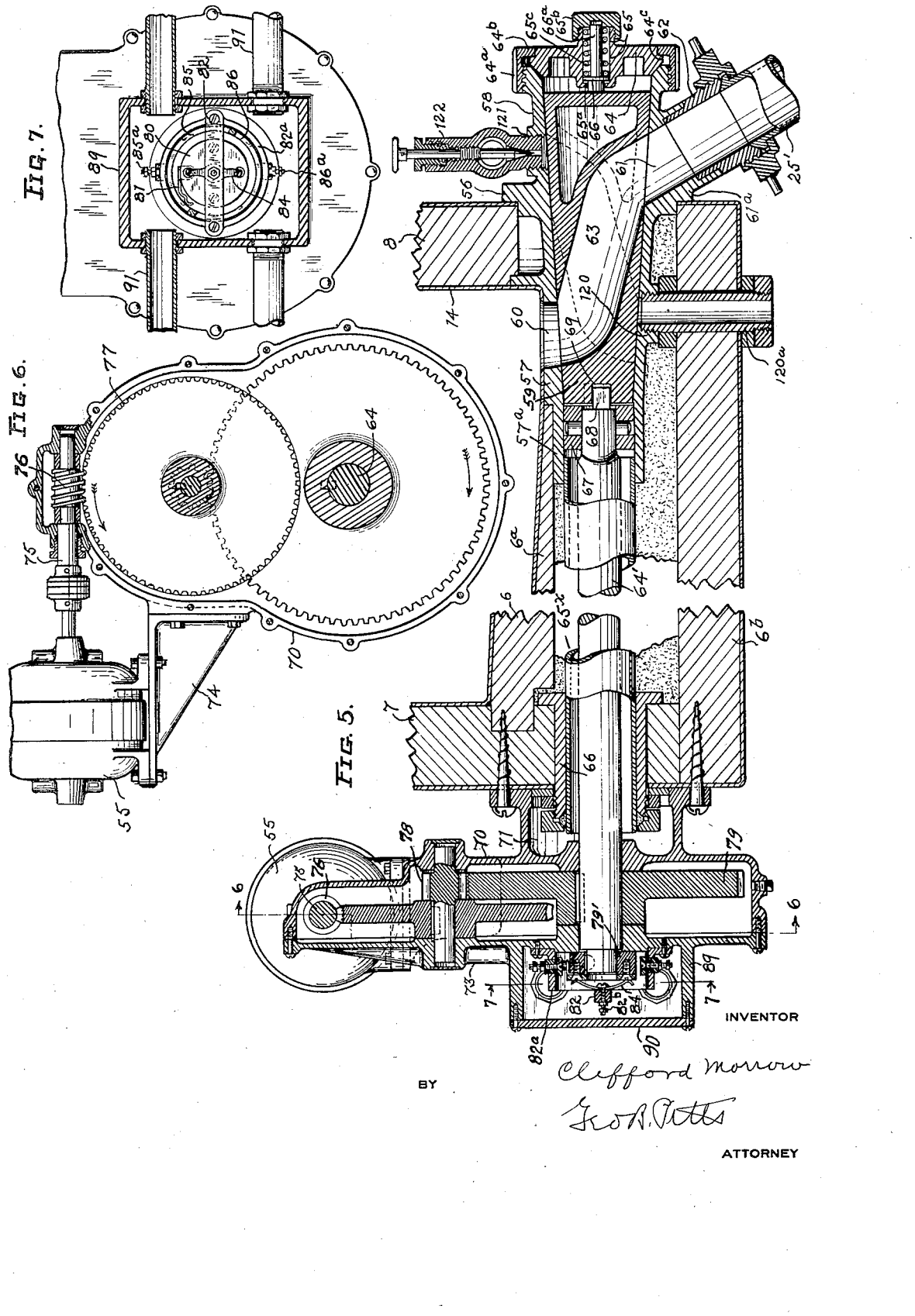

Dec. 17, 1935.   C. MORROW   2,024,179
PASTEURIZER
Original Filed June 14, 1930    7 Sheets-Sheet 6
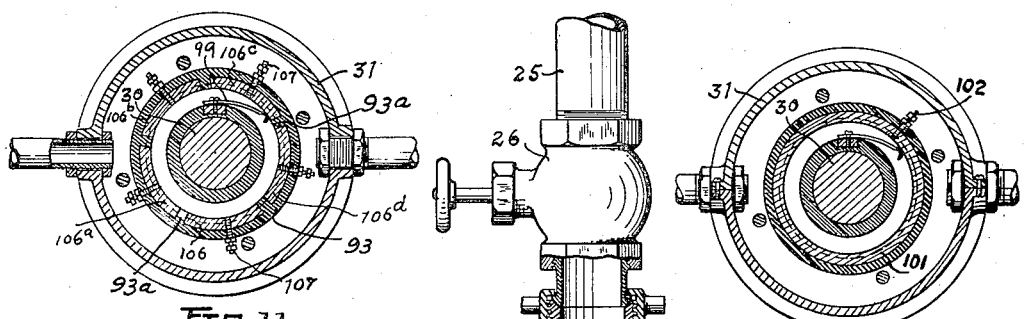
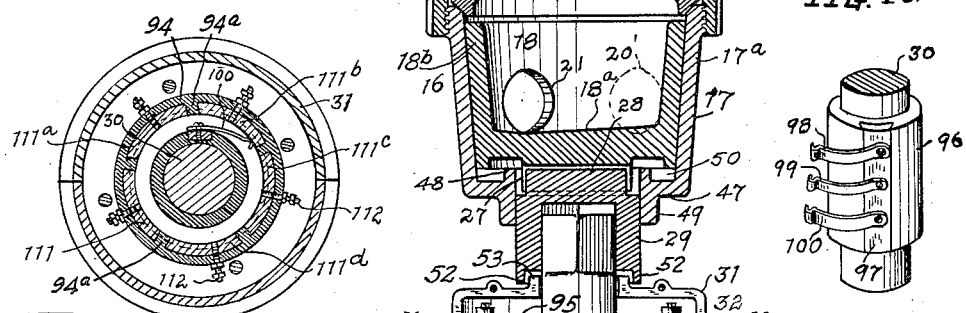
INVENTOR
Clifford Morrow
BY
Geo. B. Pitts
ATTORNEY

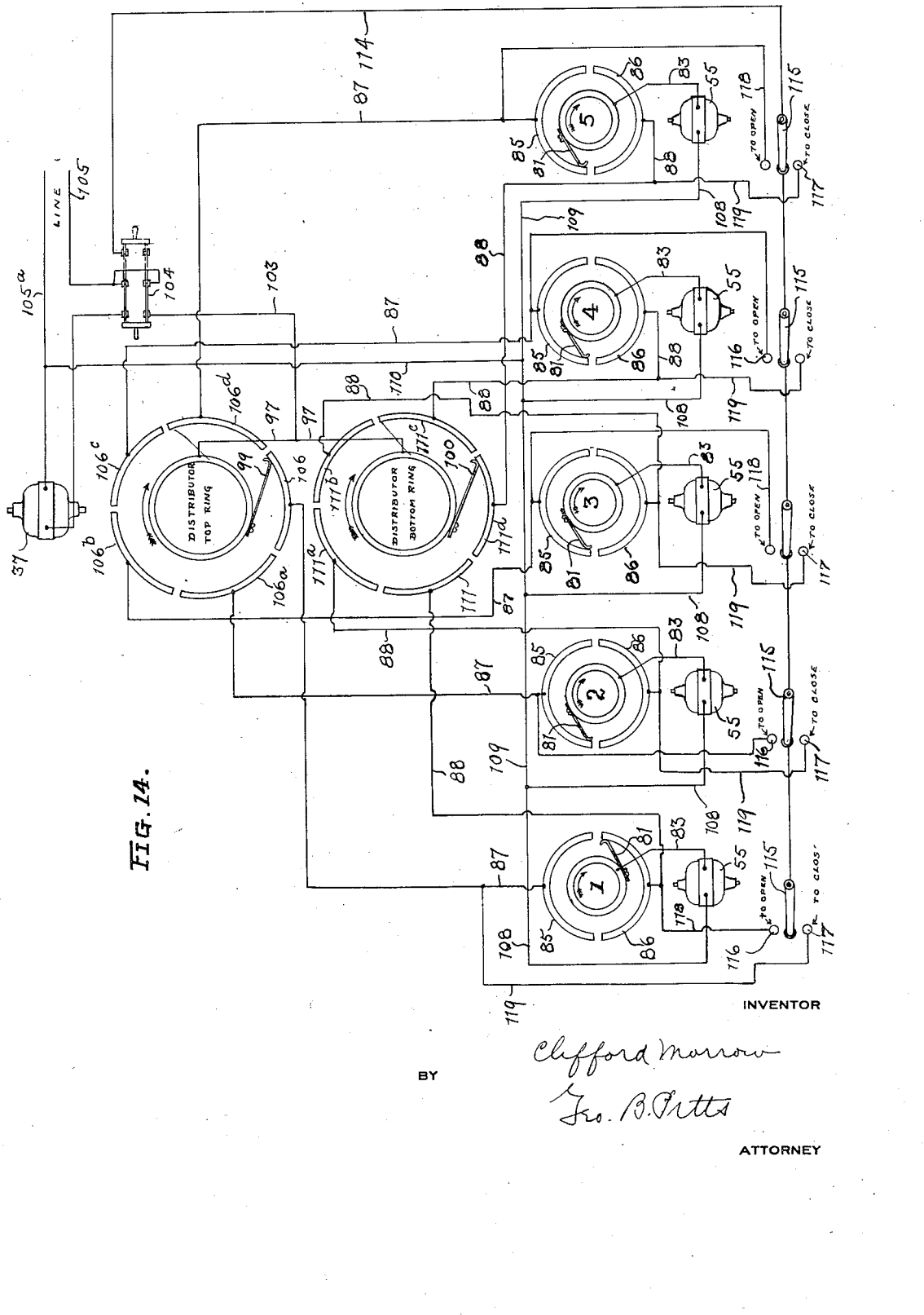

Patented Dec. 17, 1935

2,024,179

UNITED STATES PATENT OFFICE 2,024,179

PASTEURIZER

Clifford Morrow, Canton, Ohio, assignor to The H. H. Miller Industries Company, Canton, Ohio, a corporation of Ohio Application June 14, 1930, Serial No. 461,221
Renewed February 2, 1934

14 Claims. (Cl. 137—21)

This invention relates to the treatment of liquid, for example, the pasteurizing of milk, more particularly to apparatus having a plurality of compartments for holding portions of the milk and means for controlling its supply and discharge to and from the holding compartments.

One object of the invention is to provide an improved apparatus of this character in which the supply and discharge of milk to and from the holding compartments are positively controlled to insure filling in sequence and discharge in sequence.

Another object of the invention is to provide an improved apparatus of this character in which (a) each holding compartment is provided with a valved controlled inlet and a valved controlled outlet, to insure complete treatment and discharge of all the liquid supplied to each compartment and (b) the discharge valves are controlled in sequence but independently one from the other.

Another object of the invention is to provide in apparatus of this character a valve mechanism for supplying liquid in sequence to the series of compartments and separate discharge valve mechanisms for the compartments, respectively, controlled in sequence by the driving means for the supply valve mechanism.

Another object of the invention is to construct a pasteurizing apparatus in which each holding compartment is provided with an improved valve arranged, when closed, to cut off the milk discharge approximately at the level of the compartment bottom, but when open to deliver the treated milk to a pipe which is accessible, whereby the pipe and valve may be readily disconnected.

Another object of the invention is to construct a pasteurizing apparatus in which each holding compartment is provided with an improved valve having (a) a valve element arranged to make one-half revolution when opened or closed and formed with a passage extending at an angle to the axis of the element and opening at opposite sides thereof and (b) a valve casing formed with an upper port constituting the discharge for the compartment and a lower port connected with a waste conduit, the inlet end of said passage registering with said upper port to effect emptying of the compartment and registering with the lower port to permit discharge of any milk remaining in said passage or which drains from the walls thereof.

Other objects of the invention will be apparent to those skilled in the art to which my invention relates from the following description taken in connection with the accompanying drawings, wherein Fig. 1 is a front elevation of an apparatus embodying my invention, parts being broken away.

Fig. 2 is rear elevation.

Fig. 3 is section on the line 3—3 of Fig. 1.

Fig. 4 is a section on the line 4—4 of Fig. 1.

Fig. 5 is a fragmentary section illustrating parts shown in Fig. 4, but somewhat enlarged.

Fig. 6 is a section on the line 6—6 of Fig. 5.

Fig. 7 is a section on the line 7—7 of Fig. 5.

Fig. 8 is a section on the line 8—8 of Fig. 4, somewhat enlarged.

Figs. 9, 10, 11 and 12 are sections on the lines 9—9, 10—10, 11—11 and 12—12 of Fig. 8, respectively.

Fig. 13 is a fragmentary perspective view.

Fig. 14 is a diagram of the electrical circuits.

The apparatus herein disclosed is adapted to continuously receive milk, which has been previously heated to the desired temperature, for example 142° F., to hold it in its heated condition for a predetermined period to destroy certain bacteria and to then discharge the milk for conduction to a cooler. The heater and cooler (which are not shown) may be of any desired construction. The holder for the milk comprises a plurality of compartments 1, 2, 3, 4 and 5 for receiving and holding the heated milk, the supply of the milk to and its discharge from each compartment being controlled so that the milk therein is held for a predetermined period of time, preferably for approximately 30 minutes at the desired temperature, for example, approximately 142° F., as is customary in apparatus of this character. The compartments may be constructed and mounted separately as shown in Letters Patent No. 1,076,604 granted to Leroy S. Pfouts, or in a unitary, circular series as shown in Letters Patent No. 1,300,869 granted to George B. Pitts, but preferably they are arranged in side by side relation and incorporated into a single, unitary structure having a bottom 6, front and rear walls 7, 8, respectively, end walls 9 and intermediate partitions 10, which in co-operation with the remaining walls form the compartments or holders 1, 2, 3, 4 and 5. In this preferred arrangement, the milk is supplied to each compartment by a conduit, to which reference will later be made. Furthermore, the number of compartments may be increased or decreased, as desired, and the same may be filled and emptied in any desired sequence.

11 indicates a top wall extending between the end walls 9 and forming a support for a cover 12.

By preference, the top wall 11 is arranged intermediate the front and rear walls 7, 8, and has a cover 12 hinged along either longitudinal edge. As shown, each of the walls, including the top wall 11 and covers 12, embody suitable heat insulating material, shown at 13, to prevent cooling of the heated milk while it is being held in each compartment. The construction of these walls to insure heat insulation may be of any desired form, also the bottom 6 comprises upper and lower walls 6a, 6b, for a purpose which will later appear. The interior of each compartment is suitably lined, as shown at 14, to insure durability and to prevent leakage, and the bottom of each compartment is inclined from the outlet (which is preferably arranged near the rear wall 8) upwardly to the front wall and to the adjacent partitions 10 to insure drainage when the compartment is emptying.

16 indicates as an entirety a valve mechanism for controlling the supply of milk to the compartments 1, 2, 3, 4 and 5 in the desired sequence, such supply being continuous so long as heated milk flows from the heater and the valve mechanism operates. The supply valve mechanism comprises a seat member 17 and a valve member 18 rotatably fitted within the seat member 17. The seat member is formed in its side wall with discharge ports 19 (one for each compartment) connected by conduits 1a, 2a, 3a, 4a and 5a, respectively, with the compartments 1, 2, 3, 4, 5, these conduits leading through the side walls 7 near the tops of the compartments and connected to down pipes 20, which discharge the liquid near the bottoms 6 to prevent foaming. The valve seat member 17 is preferably of conical shape and the valve element is similarly shaped and provided with a bottom 18a to form a receiving chamber for the milk. The side wall 18b of the valve member is formed with a discharge port 21 adapted to register with the ports 19 successively, as the valve member rotates. The side wall 17a of the seat member 17 extends above the valve member 18 and is shaped to receive a plate 22, which is secured to the side wall 17a by a union 23, the plate forming a closure for the chamber within the valve member. The plate is sealed on the upper edge of the side wall 17a, by means of ground surfaces between such edge and the plate (see Fig. 8) to prevent leakage of the milk. The plate 22 is provided with a nipple or pipe end 24 to which is detachably connected a supply pipe 25 for the heated milk leading from the heater, this pipe being provided with a cut-off 26. The milk is continuously supplied by the pipe 25 and from the latter the milk, under control of the valve mechanism 16, flows to the compartments successively and is discharged therefrom successively, as will later appear, into a discharge pipe 25' which conveys the milk to a cooler (not shown), so that the milk flow from the heater to the holding apparatus and from the latter to the cooler is continuous and may be continued for an indefinite period of time. The side walls 17a, 18b, are preferably of conical shape to permit ready removal of the valve member 18 and to prevent leakage due to wear.

The bottom 18a of the valve member 18 is provided with a diametrically extending lug formed with a slot 27 into which removably fits a key 28 provided on a device 29 serving as a coupler between the valve member 18 and a driven shaft 30. The shaft 30 extends through a housing 31 for a controlling switch mechanism 32 and is mounted in hollow bosses 33, 34, provided on the upper and lower walls of a gear casing 35. The shaft 30 is driven at the desired speed through a driving means 36, which includes a suitable reduction gearing 36, by an electric motor 37, as follows: the motor shaft is provided with a sprocket 38 for a chain 39, which drives a sprocket 40, fixed to a shaft 41. The shaft 41 is mounted in suitable bearings in the casing 35 and carries a worm 42 meshing with a worm gear 43. The gear 43 is fixed to a countershaft 44 (also mounted in bearings provided on the walls of the casing 35) having keyed to it a pinion 45. The pinion 45 operates through a gear train, the gear elements of which are loosely mounted on the shafts 44, 30, within the casing 35, to drive a gear 46 fixed to the latter shaft, whereby the speed of rotation of the valve member 18 is reduced so that the latter may effect registration of the port 21 with the ports 19 at the desired intervals.

Means are provided for preventing leakage of the milk into the control switch casing 31, as well as into the gear casing 35, and permitting the escape of any milk that may leak past the valve member 18. As shown in Fig. 8, the seat member 17 has an inturned flange 47 having an upstanding collar 48 and a depending collar 49. The upstanding collar 48 forms a collecting channel 50 for milk if any leaks past the valve member 18 and this milk may escape through a discharge pipe 51 (see Figs. 1 and 4). The coupling device 29 is of inverted cup-shape and removably fits the upper end of the shaft 30, the inner wall of said device and shaft having complementary portions. The upper end of the coupling device 29 rotatably fits the depending collar 49, while its lower end is provided with a skirt 52 which surrounds a flange or annular rib 53 around the opening in the casing 31 for the shaft 30. By constructing the coupling device 29 to fit over and enclose the upper end of the shaft 30 and providing its lower end and wall of the casing 31 with co-operating elements, danger of any milk finding its way through the shaft opening is entirely eliminated.

Each of the compartments 1, 2, 3, 4, 5, is provided with a discharge valve 54, which is opened and closed by an electric motor 55, under the control of the switch mechanism 32, the switch mechanism serving to control the motors for the several valves so that the valve for each compartment is first opened and then closed in advance of the filling of the compartment, whereby each compartment is emptied and the discharge valve closed before filling thereof commences. As the shaft 30 rotates the valve element 18 and controls or actuates the switch mechanism to open and close the circuits for the motors 55 successively it will be seen that each discharge valve 54 for the adjacent compartment is operated in a predetermined relation to the period that the discharge port 21 of the supply valve 16 registers with the port 19 for that compartment.

Each valve 54 comprises a hollow casting or member having a body portion 56 and inner and outer portions 57, 58, the inner walls of the member being of conical shape to form a seat for a rotary conical valve element 59. The inner portion 57 extends between the bottom walls 6a, 6b, and it and the body portion are incorporated in the wall 6 and rear wall 8 and covered by the lining 14 in a permanent, liquid tight manner. The inner portion 57 is formed on its upper side with an opening 60 which forms the discharge opening from the adjacent compartment (the lining being formed with an opening registering with the opening 60), and the outer portion 58 is formed on its lower side with an opening 61 surrounded by a tubular projection 61a to which is sweated or otherwise secured a pipe section 62 adapted to be detachably connected to the adjacent discharge pipe 25'. The valve element 59 is formed with a passage 63 extending diametrically from one side to the other, but at an inclination to the axis of the element, so that when the valve element is in the position shown in Figs. 4 and 5 (open), the inner end of the passage 63 registers with the opening 60 and the outer end of the passage 63 registers with the opening 61, whereby the milk in the adjacent compartment may flow therefrom. The valve element 59 is held to its seat, preferably in a yielding manner, by the following means; 64 indicates a cap having a ground seat engaging a ground seat on the outer end of the tubular portion 58 to form a liquid tight closure for the valve casing. The outer side of this portion 58 adjacent its end is provided with screw threads for a coupling ring 64a, the inturned flange 64b of which engages the flange 64c on the periphery of the cap 64 to secure the latter in position. 65 indicates an axial opening formed in the cap 64, the opposite faces of the cap having hollow bosses or collars surrounding the opening 65. The inner boss has an inturned flange forming a stop 65a, as will later appear and the outer boss is externally threaded to removably receive a cap 65b, which forms an abutment for one end of a coiled spring 65c mounted in the opening, the other end of the spring bearing against a collar 66 fixed to a rod or plunger 66a projecting through the inner boss and engaging at its inner end the valve element and normally tending to force the rod toward the valve element, whereby the latter is held yieldingly to its seat. When the cap 64 is removed, the stop 65a prevents the collar 66 and rod from being forced out of the opening 65. The cap 65b is secured to the outer boss in a liquid tight manner. Each motor 55 for rotating one of the valve elements is arranged when its circuit is closed to rotate it one-half revolution at which time the motor circuit is broken to stop the valve in one position (either open as shown in full lines in Figs. 4 and 5 or closed as shown in dotted lines in the latter figure) and then upon the closing of another circuit the motor is arranged to rotate the valve a half revolution in the same direction, at which time the circuit is again broken, stopping the valve in its other position. Accordingly it will be seen that by rotating each valve one half revolution in a predetermined sequence in relation to the successive filling of the compartments by the supply valve mechanism 16, the emptying and filling of the compartments will be effected in the manner already described.

64' indicates the shafts for rotating the valve elements 59, there being one shaft, driven by one of the motors 55, for each element. Each shaft extends through a sleeve 65x mounted at its inner end in the tubular extension 57a of the valve casing portion 57 and at its outer end mounted in a collar 66 fitted and secured in an opening formed in the wall 7. As will be understood from Figs. 4 and 5, the sleeves 65x are disposed between the walls 6a and 6b. The inner portion of each shaft 64' is provided with a collar 67 rotatably fitting the tubular extension 57a of the adjacent valve casing and its free end is provided with a clutch or connecting device, preferably comprising a projection 68 of square shape in cross section fitting a correspondingly shaped recess 69 in the inner end of the valve element 59. It will be noted that the projection 68 and recess 69 therefor are disposed slightly off or out of line with the axis of the shaft 64' and valve element 59; this arrangement insures the replacement of the valve element, if removed, in the same position with respect to the angular position of the shaft that it occupied before removal. It will be noted that each sleeve 65x communicates at one end with the inner end of the adjacent valve casing and leads entirely across but below the bottom wall 6a of the compartment and is open at its opposite end, so that any milk which may leak inwardly past or around the valve member 59, may escape through the sleeve. The form of construction shown facilitates cleaning of the valve casing.

70 indicates casings one for the driving means between each motor 55 and the shaft 64' driven thereby, each casing having a chamber 71 into which the open end of the adjacent sleeve 65 projects, and the chamber being provided with an escape opening (not shown). The side walls of the chamber 71 are flanged and suitably secured to the wall 7, to support the casing thereon. The front wall of the chamber is formed with a bearing for the shaft 64', which projects through the casing and also an opening formed in the cover member 73 for the casing, for a purpose to be later set forth. Each motor 55 is mounted on a bracket 74 fixed to the adjacent casing 70 (see Figs. 1 and 6) and its shaft is connected to a shaft 75 mounted in the walls of the casing. The shaft 75 is provided with a worm 76, meshing with a worm gear 77, the shaft for the latter being mounted in suitable bearings in the casing 70 and cover member 73 and having a pinion 78 meshing with a gear 79 fixed to the shaft 64', whereby the latter is driven by the motor, in the manner later to be set forth. The free end of each shaft 64' has fixed to it an annular member 79' of insulating material to which is fixed a disk 80 of conducting material. At one side of the disk is secured the flange of a brush 81, the purpose of which will later appear. 82 indicates a bridge of suitable insulating material disposed in front of the shaft 64', and secured at its ends to the walls of a ring 82a, the latter being bolted to the cover member 73. The bridge 82 is provided with a binding post 82b to which a lead 83 is secured (see Fig. 14). The binding post 82b serves to secure to the inner side of the bridge a conductor 84 comprising a resilient member bearing at its ends on the disk 80 to conduct current thereto. 85, 86, indicate a pair of substantially semi-circular switch elements mounted within the ring 82a, but insulated therefrom and from each other at their ends, and adapted to be yieldingly engaged by the brush 81, as the shaft 64' causes it to revolve. The semi-circular switch elements are provided with binding posts 85a, 86a, respectively, the binding post 85a being connected to a lead 87 and the binding post 86a being connected to a lead 88. The parts just described are enclosed in a housing 89 provided on the cover member 73, such housing having a cover 90 and wire conduits 91 connected to the housing. As the drive mechanisms for the shafts 64' and the switch mechanisms controlled thereby are similar, the foregoing description will apply to each such drive mechanism and switch mechanism.

It will be noted from Fig. 14 that the control switch mechanism 32 comprises two switch mechanisms, one of which closes certain circuits for the motors 55 in a predetermined sequence to rotate the discharge valves from closed to open position and the other of which closes other circuits for the motors 55 in a similar sequence to rotate the discharge valves from open to closed position; also that when one switch mechanism closes one circuit such circuit is completed through one semi-circular contact and the disengagement of the brush 81 from such contact breaks the circuit, whereas the engagement of the brush 81 with the other semi-circular contact permits the other circuit to be closed by the other switch mechanism according to the predetermined sequence. Fig. 7 shows the position of the brush 81 when the adjacent valve 54 is closed, this being the position of the discharge valves diagrammatically shown in Fig. 14 for the compartments 2, 3, 4 and 5.

Of the switch mechanism 32: 92, 93, 94, indicate annular members, formed of insulating material surrounding the shaft 30 and preferably supported on each other and the top of the casing 35, being rigidly clamped to said top by a plate 95, which is bolted thereto. The plate 95 also holds in position on the shaft 30 a sleeve 96 of insulating material, the sleeve being suitably keyed to the shaft so as to be rotated thereby. The sleeve 96 carries a strip 97 of conducting material to which are secured three brushes 98, 99, 100. 101 indicates a ring formed of conducting material suitably mounted in the annular member 92. The ring 101 is provided with a binding post 102 to which is connected a lead 103 connected through a switch 104 with one supply main 105. 106, 106a, 106b, 106c and 106d indicate conductor segments mounted in the ring 93 and spaced from each other by spacers 93a formed integral with the ring, these segments being arranged to be successively engaged by the brush 99 as the shaft 30 rotates. Each segment is provided with a binding post 107 to which one of the leads 87 is connected, the lead being connected at its other end to one semi-circular contact 85, as already described. There being one segment for each motor 55, it will be seen that when the brush 99 rides a segment it will complete the circuit through the adjacent lead 87 to the switch contact 85 fixed to one of the valve operating shafts 64' and if the adjacent valve is closed (valves designated "2", "3", "4" and "5" in Fig. 14 being shown closed), the circuit will be completed through the brush 81 conductor 84, lead 83 to one side of the adjacent motor 55 and from the other side of the latter, by lead 108 and common return wires 109, 110 to the other supply main 105a. 111, 111a, 111b, 111c and 111d indicate conductor segments mounted in the ring 94 and spaced from each other by spacers 94a formed integral with the ring, these segments being arranged to be successively engaged by the brush 100 as the shaft rotates. Each segment is provided with a binding post 112 to which one of the leads 88 is connected, the lead being connected at its other end to one semi-circular contact 86. There being one segment for each motor 55, it will be seen that when the brush 100 rides a segment it will complete the circuit through the lead 88 to the switch contact 86 fixed to one of the valve operating shafts 64' and if the adjacent valve is open (the valve designated "1" in Fig. 14 being open), the circuit will be completed through the brush 81, conductor 84, lead 83 to one side of the adjacent motor 55 and from the other side of the motor 55 through the adjacent lead 108 and common return wires 109, 110 to the supply main 105a.

Fig. 14 shows diagrammatically the two control switch mechanisms and the five switches each including a brush 81 revolved by a discharge valve shaft. The numerals "1", "2", "3", "4", "5" represent these shafts or the respective milk holding compartments. In this view the discharge valve for compartment "1" is open and the compartment is emptying; the discharge valves for the compartments "2", "3" and "4" are closed and these compartments have been filled; and the discharge valve for compartment "5" has just closed.

Fig. 14 shows the brush 99 riding segment 106, its engagement with the latter having completed the circuit through the contact 85 for the valve shaft of compartment "1" to operate the adjacent motor 55 and the motor has rotated the shaft one-half revolution and opened the valve (as shown in Figs. 4 and 5) and the motor circuit has been broken by the brush 81 disengaging the contact 85. The discharge valve for the compartment controlled by the shaft designated "1" in Fig. 14, being open, such compartment is emptying, as already set forth. Simultaneously with the movement of the brush 99 into contact with the segment 106, the brush 100 has moved into contact with the segment 111d and effected closing of the discharge valve for compartment "5" so that it may be filled with heated milk. Continued rotation of the shaft 30 will simultaneously move the brushes 99, 100, into contact with segments 106a, 111, respectively, the effect of which will be to open the discharge valve for compartment "2" to permit emptying thereof and to close the discharge valve for compartment "1"; next, the brushes 99, 100, will simultaneously engage segments 106b, 111a, respectively, the effect of which will be to open the discharge valve for compartment "3" to permit emptying thereof and to close the discharge valve for compartment "2"; this progressive operation of the valves will continue so long as the shaft 30 rotates. The valve member 18 is set or adjusted angularly of the shaft 30 so that its port will register with the ports 19 immediately after the discharge valves, respectively, for the compartments are closed.

It will be noted that the shaft 30 is continuously driven in one direction, preferably by a synchronous motor. Where five compartments are shown, the shaft 30 is driven at a speed to rotate the valve element 18 one revolution in approximately fifty one minutes, divided into five periods of ten minutes each for filling and emptying and approximately twelve seconds between periods to permit the valves to operate. For example, in the first 10 minute period, compartment "1" is filling, compartment "2" is emptying and compartments "3", "4" and "5" are filled; in the second 10 minute period, compartment "2" is filling, compartment "3" is emptying and compartments "1", "4" and "5" are filled; in the third 10 minute period, compartment "3" is filling, compartment "4" is emptying and compartments "1", "2" and "5" are filled; in the fourth 10 minute period, compartment "4" is filling, compartment "5" is emptying and compartments "1", "2" and "3" are filled; and in the fifth 10 minute period, compartment "5" is filling, compartment "1" is emptying and compartments "2", "3" and "4" are filled.

I prefer to provide separate circuits, whereby each motor 55 may be operated independently of the motor 37 and control switch mechanism 16, to rotate the adjacent discharge valve, either from open to closed position or from closed to open position. For this purpose I provide a lead 114 adapted to be connected to the supply main 105 by throwing switch 104 into the position shown in dotted lines in Fig. 14, such operation serving to cut the circuit to the control switch mechanism 32. The lead 114 is provided with a series of switches 115 one for each motor 55, each switch being movable into engagement with one terminal 116 or another terminal 117. Each terminal 116 is connected by a lead 118 to the adjacent lead 87, so that if the adjacent discharge valve is closed, the motor circuit will be closed through contact 85, brush 81, lead 83 to one side of the motor 55 and from the other side of the motor through leads 108, 109 and 110 to the other main 105a so that the adjacent motor 55 will be set in operation to open the discharge valve, the circuit being broken by the brush disengaging the contact 85, as already described. Each terminal 117 is connected by a lead 119 to the adjacent lead 88, so that if the adjacent discharge valve is open, the motor circuit will be completed through the contact 86, brush 81, lead 83 to one side of the motor and from the other side of the motor 55 through the leads 108, 109 and 110 to the supply main 105a, so that the adjacent motor 55 will be set in operation to close the discharge valve, the circuit being broken by the brush disengaging the contact 86, as already described.

120 indicates a threaded opening formed in the lower side of each inner valve casing portion 57 and having a pipe section 120a threaded therein and leading downwardly through the wall 6b (see Fig. 5). The opening 120 is positioned so that the inlet end of the discharge passage 63 registers therewith when the valve is rotated to closed position (that is, 180 degrees from its full open position as shown in dotted lines in Fig. 5), whereby any milk in the passage or excess thereof adhering to the walls of the passage may drain away through the pipe 120a. 121 indicates a threaded opening formed in the upper side of each outer valve casing portion 58 and having the casing of a needle valve 122 threaded therein. The needle valve casing is connected with a steam pipe 123 leading from a source of steam supply. The opening 121 and the discharge port of the needle valve 122 register with the discharge port of the valve passage 63 when in the position shown in dotted lines in Fig. 5, so that the steam flowing through the valve 122 serves to sterilize as well as heat the walls of the valve passage 63. Rotation of the valve member 59 to its open position closes the opening 121 and hence prevents escape of the steam. In the arrangement shown, rotation of each valve member one half revolution positions its ports to permit discharge of the milk from the adjacent compartment and shuts off the steam supply and drain connection and rotation of the valve member another half revolution positions its ports to permit injection of steam into the valve passage and drainage of any milk left in such passage.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a series of holding compartments each having a liquid inlet connection, a source of liquid supply, a valve mechanism between said supply means and said liquid inlet connections and common to the latter, said mechanism having a rotary valve member for connecting said source of liquid supply to said liquid inlet connections in sequence, driving means for said rotary member, a discharge valve for each compartment, a motor for operating each said valve, and means operated by the driving means for said rotary member to actuate said motors in sequence.

2. In apparatus of the class described, the combination of a series of holding compartments each having a liquid inlet connection, a source of liquid supply, a valve mechanism between said supply means and said liquid inlet connections and common to the latter, said mechanism having a rotary valve member for connecting said source of liquid supply to said liquid inlet connections in sequence, driving means for said rotary member, a rotary discharge valve for each compartment, a motor for operating each said valve, and means operated by the driving means for said rotary member to actuate said motors in sequence.

3. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, an electric circuit for each motor, and a switch mechanism actuated by said operating means for controlling said circuits to operate said motors in sequence.

4. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, an electric circuit for each motor and a switch mechanism actuated by said operating means for controlling said circuits to operate said motors in sequence, and a switch controlled by each discharge valve when moved to one position for stopping the operating motor for said valve.

5. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, an electric circuit for each motor and a switch mechanism actuated by said operating means for controlling said circuits to operate said motors in sequence, and switches controlled by each discharge valve for stopping the operating motor for said valve at open or closed position when moved to each said position.

6. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, a pair of electric circuits for each said motor, each circuit being arranged when closed to operate the adjacent motor, and switch mechanisms each common to corresponding circuits for all said motors and controlled by said operating means to move said discharge valves in sequence from one position to another position.

7. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, a pair of electric circuits for each said motor, each circuit being arranged when closed to operate the adjacent motor, switch mechanisms each common to corresponding circuits for all said motors and controlled by said operating means to move said discharge valves in sequence from one position to another position, and limit switches for stopping each motor when the valve is rotated to each position.

8. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, a pair of electric circuits for each said motor, each circuit being arranged when closed to operate the adjacent motor, switch mechanisms each common to corresponding circuits for all said motors and controlled by said operating means to move said discharge valves in sequence from one position to another position, and limit switches for stopping each motor when the valve is rotated to each position, each said limit switch comprising a pair of contacts and a brush, said brush being carried by the rotary element of the adjacent valve.

9. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, electric circuits for said motors, a brush secured to the rotary element of each said discharge valve, a pair of contacts arranged to be separately engaged by said brush as it is revolved by said element, each motor circuit being completed through said brush and one of said contacts to operate said motor to rotate the adjacent valve from one position to another position, and a switch mechanism actuated by said operating means for controlling said electric circuits to operate said motors in sequence.

10. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, electric circuits for said motors, a brush secured to the rotary element of each said discharge valve, a pair of contacts arranged to be separately engaged by said brush as it is revolved by said element, each motor circuit being completed through said brush and one of said contacts to operate said motor to rotate the adjacent valve from one position to another position, and a switch mechanism actuated by said operating means for controlling said electric circuits to operate said motors in sequence, said contacts of each pair being alternately connected in the motor circuits by said switch mechanism, whereby the disengagement of the brush with the contact through which the circuit was completed by said switch mechanism will stop the adjacent motor.

11. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, electric circuits for said motors, a brush operatively connected to the rotary element of each said discharge valve, a pair of contacts arranged to be separately engaged by said brush as it is revolved by said element, each motor circuit being completed through said brush and one of said contacts to operate said motor to rotate the adjacent valve from one position to another position, and a switch mechanism actuated by said operating means for controlling said electric circuits to operate said motors in sequence, said contacts of each pair being alternately connected in the motor circuits by said switch mechanism, whereby the disengagement of the brush with the contact through which the circuit was completed by said switch mechanism will stop the adjacent motor, and each said contact being substantially of semi-circular shape, whereby the motor will be stopped when the valve element has rotated a half revolution.

12. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, electric circuits for said motors, a series of segments each electrically connected to one of said motors, a brush revolved by said operating means and arranged to engage said segments successively to operate said motors in a predetermined sequence, a separate series of segments each electrically connected to one of said motors, a brush disposed in a predetermined angular relation to said first mentioned brush and revolved by said operating means and arranged to engage the last mentioned segments successively to operate said motors in a predetermined sequence, and a limit switch means for each motor arranged to stop the latter when the adjacent discharge valve has rotated a predetermined distance.

13. In apparatus of the class described, the combination of a series of holding compartments, a source of liquid supply, a valve mechanism for controlling the supply of the liquid to said compartments in sequence, means for operating said valve mechanism, a discharge valve for each compartment, an electric motor for operating each discharge valve, electric circuits for said motors, a series of segments each electrically connected to one of said motors, a brush revolved by said operating means and arranged to engage said segments successively to operate said motors in a predetermined sequence, a separate series of segments each electrically connected to one of said motors, a brush disposed in a predetermined angular relation to said first-mentioned brush and revolved by said operating means and arranged to engage the last mentioned segments successively to operate said motors in a predetermined sequence, and a switch controlled by the rotary element of each discharge valve to open the circuit for the motor for said valve to stop the said motor when said valve is rotated to its open position or to its closed position.

14. In apparatus of the class described, the combination of a series of compartments, means for supplying liquid thereto in a predetermined sequence, a discharge valve for each compartment, an electric motor and circuits therefor for operating each valve, said circuits for each motor including a pair of separated contacts and a switch element actuated by the adjacent valve and arranged to engage said contacts alternately to complete one circuit for the motor and break the other circuit therefor, and circuit closing means for closing the motor circuits through corresponding contacts of said pairs of contacts in sequence to open the said valves, separate circuit closing means for closing the motor circuits through the other contacts in a corresponding sequence to close the said valves, and means for operating said liquid supply means and said circuit closing means at a fixed relative speed in operative relation to fill said compartments when the respective valves therefor are closed.

CLIFFORD MORROW.